US011285345B2

(12) United States Patent
Strobl

(10) Patent No.: US 11,285,345 B2
(45) Date of Patent: Mar. 29, 2022

(54) MULTI-STAGE NASAL FILTER

(71) Applicant: Frederick Thomas Strobl, Scottsdale, AZ (US)

(72) Inventor: Frederick Thomas Strobl, Scottsdale, AZ (US)

(*) Notice: Subject to any disclaimer, the term of this patent is extended or adjusted under 35 U.S.C. 154(b) by 0 days.

(21) Appl. No.: 16/882,211

(22) Filed: May 22, 2020

(65) Prior Publication Data

US 2021/0268320 A1  Sep. 2, 2021

Related U.S. Application Data

(63) Continuation-in-part of application No. 16/806,857, filed on Mar. 2, 2020, now Pat. No. 10,946,224.

(51) Int. Cl.
| | | |
|---|---|---|
| *A62B 23/06* | (2006.01) | |
| *B01D 39/16* | (2006.01) | |
| *B01D 36/00* | (2006.01) | |

(52) U.S. Cl.
CPC ............ *A62B 23/06* (2013.01); *B01D 36/001* (2013.01); *B01D 39/1692* (2013.01); *B01D 2201/02* (2013.01); *B01D 2201/088* (2013.01); *B01D 2201/12* (2013.01); *B01D 2239/025* (2013.01); *B01D 2239/0442* (2013.01); *B01D 2239/0631* (2013.01); *B01D 2239/1216* (2013.01)

(58) Field of Classification Search
CPC .. A62B 23/06; A62B 7/10; A62B 9/06; A61F 5/08; B01D 2201/02; A41D 13/11
See application file for complete search history.

(56) References Cited

U.S. PATENT DOCUMENTS

| | | | |
|---|---|---|---|
| 2,162,583 A * | 6/1939 | Kjellsson | A62B 23/06 |
| | | | 128/206.11 |
| 3,457,917 A | 7/1969 | Mercurio | |
| 3,463,149 A | 8/1969 | Abu | |
| 4,052,983 A | 10/1977 | Bovender | |
| 4,267,831 A | 5/1981 | Aguilar | |
| 4,856,509 A | 8/1989 | Lemelson | |
| 5,417,205 A | 5/1995 | Wang | |
| 5,425,359 A | 6/1995 | Liou | |

(Continued)

FOREIGN PATENT DOCUMENTS

| | | | | |
|---|---|---|---|---|
| WO | WO-2017089912 A1 * | 6/2017 | ............. | A62B 23/06 |
| WO | WO-2018158781 A1 * | 9/2018 | ............. | A62B 23/06 |

OTHER PUBLICATIONS

X. Qin, S. Subianto, "ElectroSpun Nanofibers"; 2017, Woodhead Publishing Series In Textiles, pp. 449-466.

(Continued)

*Primary Examiner* — Samchuan C Yao
*Assistant Examiner* — Cana A Gallegos
(74) *Attorney, Agent, or Firm* — Jennings, Strouss & Salmon, PLC

(57) ABSTRACT

Intra-nasal filter devices and methods for their manufacture and use are disclosed. An intra-nasal filter device includes: a first stage filter proximate the septum; and a second stage filter comprising a flexible material extending upwardly from the first filter stage filter; wherein the flexible material comprises: an impedance in the range of 0.02 to 0.2 cmH$_2$O; an effective cross-sectional area in the range of 0.2 to 2 square inches; and a plurality of radially extending geometric structures disposed along an axial length of the second stage.

15 Claims, 6 Drawing Sheets

(56) References Cited

U.S. PATENT DOCUMENTS

| | | | |
|---|---|---|---|
| 5,568,808 A | 10/1996 | Rimkus | |
| 5,890,491 A | 4/1999 | Rimkus | |
| 6,119,690 A | 9/2000 | Pantaleo | |
| 6,494,205 B1 | 12/2002 | Brown | |
| 7,735,491 B2 | 6/2010 | Doshi et al. | |
| 7,918,224 B2 | 4/2011 | Dolezal | |
| 10,322,304 B2 | 5/2019 | Kroneberg | |
| 2003/0106556 A1* | 6/2003 | Alperovich | A62B 23/06 128/206.11 |
| 2003/0209145 A1 | 11/2003 | Soper | |
| 2005/0066972 A1 | 3/2005 | Michels | |
| 2005/0150385 A1 | 7/2005 | Huang et al. | |
| 2007/0277832 A1 | 12/2007 | Doshi | |
| 2009/0007919 A1* | 1/2009 | Dolezal | A62B 7/10 128/206.11 |
| 2009/0320849 A1* | 12/2009 | Biedermann | A41D 13/1192 128/206.28 |
| 2010/0307119 A1* | 12/2010 | Leung | B01D 39/2017 55/488 |
| 2012/0060842 A1* | 3/2012 | Curtis | A62B 23/06 128/206.11 |
| 2012/0097177 A1 | 4/2012 | Boothe | |
| 2012/0279504 A1 | 11/2012 | Moore | |
| 2013/0184684 A1 | 7/2013 | Yardley | |
| 2015/0238785 A1 | 8/2015 | Chuang et al. | |
| 2016/0220854 A1 | 8/2016 | Kronenberg et al. | |
| 2017/0128515 A1 | 5/2017 | Williman | |
| 2017/0361023 A1 | 12/2017 | Anderson et al. | |
| 2018/0304108 A1 | 10/2018 | Curtis | |
| 2019/0070441 A1 | 3/2019 | Archouniani | |
| 2019/0126023 A1 | 5/2019 | Bryek et al. | |

OTHER PUBLICATIONS

Lisa Brosseau & Roland Berry Ann, "N95 Respirators and Surgical Masks", CDC, Oct. 4, 2009, 60pgs.

Ramazan Azmatula & Wasum Khan, "Synthesis and applications of Electrospun Nanofibers", Science Direct 2019, sciencedirect.com, 2pgs, pdf of Abstract.

Trevor Sparks & George Chase, "Filter Media", Filters and Filtration Handbook, Sixth Edition (2016), pp. 55-115 (in handbook), 2pgs, pdf of Abstract.

Pearl Shuang Ye Tong et al., Respiratory Consequences of N-95 Type Mask Usage in Pregnant Healthcare Workers—A Controlled Clinical Study, Antimicrobial Resistance and Infection Control (2015), 4(48), 10 pps.

Heow Pueh Lee and De Yun Wang, "Objective Assessment of Increase in Breathing Resistance of N95 Respirators on Human Subjects", Ann. Occup. Hyg., vol. 55, No. 8, Oct. 2011, 917-921.

SSkaria, et al., "Respiratory Source Control Using Surgical Masks With Nanofiber Media", Ann. Occup. Hyg., vol. 58, No. 6, Jul. 2014, 771-781.

\* cited by examiner

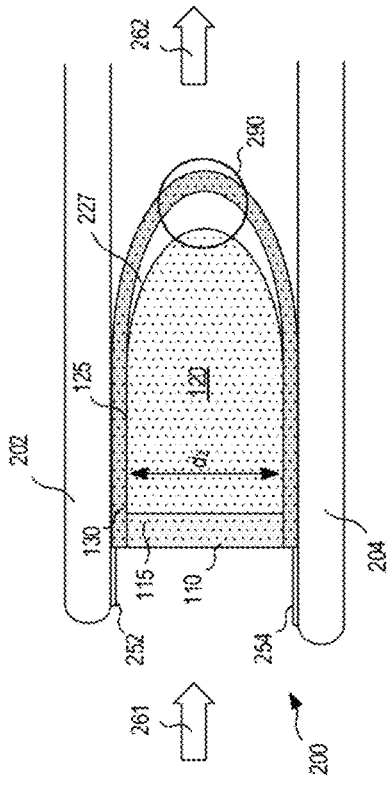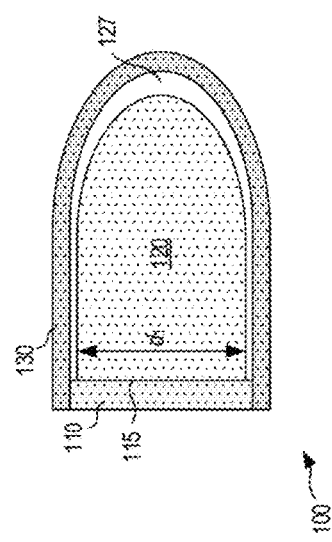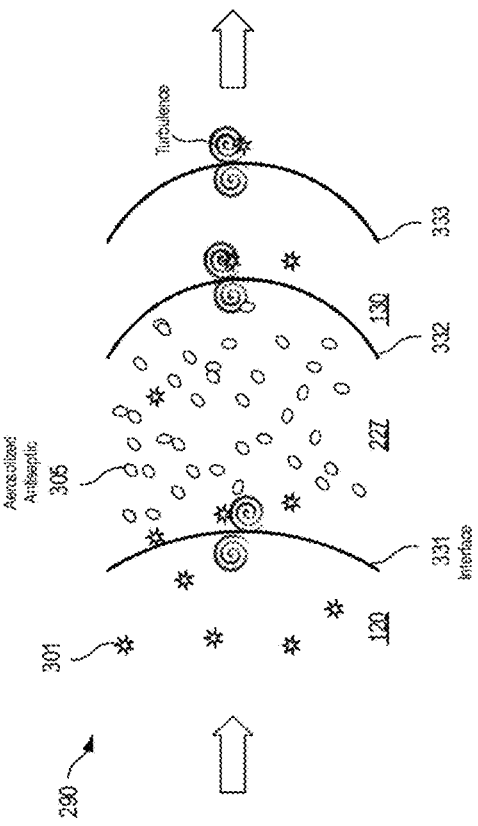

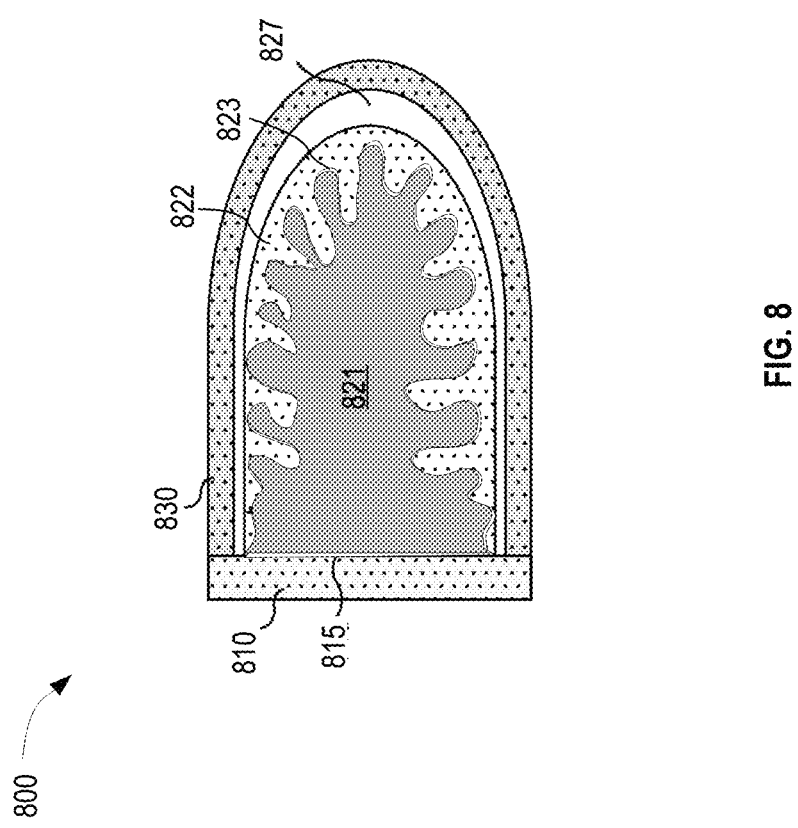

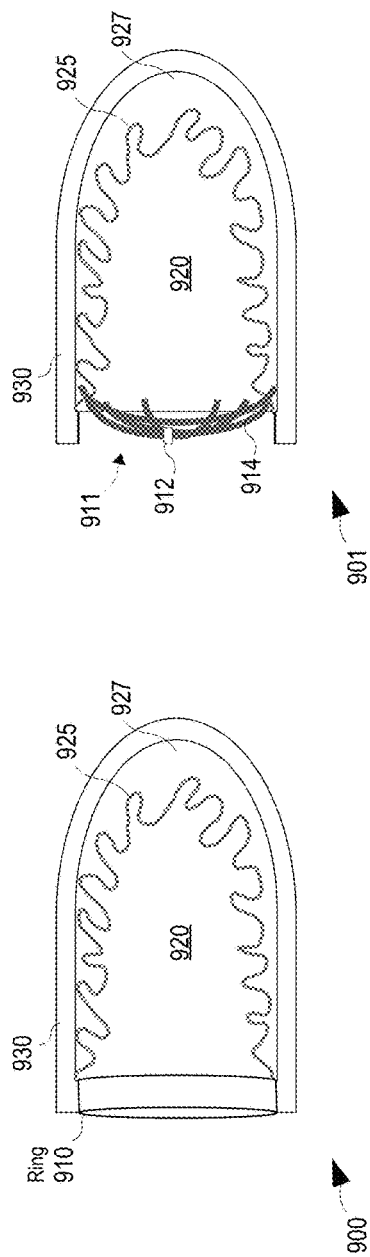
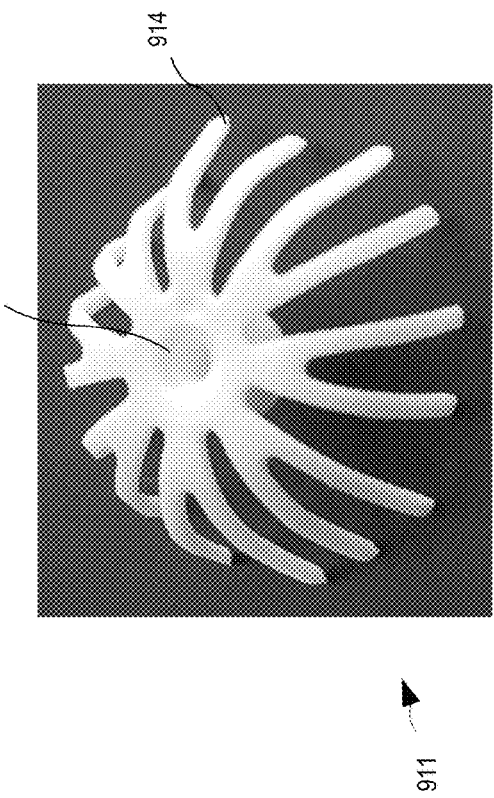
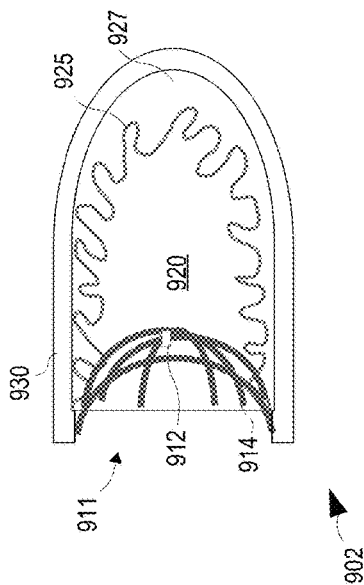
FIG. 10A
FIG. 11
FIG. 9
FIG. 10B

MULTI-STAGE NASAL FILTER

REFERENCE TO RELATED APPLICATIONS

This non-provisional patent application is a continuation-in-part application of U.S. patent application Ser. No. 16/806,857 filed Mar. 2, 2020, the entire contents of which is hereby incorporated by this reference.

TECHNICAL FIELD

The present disclosure generally relates to a multi-stage filtration device insertable into human nostrils for filtering allergens and pathogens from an inhaled ambient air stream and, more particularly, to a filter material exhibiting a three dimensional topology designed to increase surface area and reduce air flow impedance.

BACKGROUND OF THE DISCLOSURE

Recent outbreaks of infectious disease have proven state of the art response protocols to be wholly inadequate, including efforts at containment, quarantine, information dissemination, vaccine development, and travel restrictions. Influenza epidemics such as SARS (Severe Acute Respiratory Syndrome) in 2003, H1N1 in 2011, avian in 2015, and the Coronavirus of 2020 share the same transmission modality—airborne particulates. Presently known face masks and nasal filters employ structural features supporting filter materials exhibiting mean pore sizes designed to remove (filter) relatively large particles such as dust, smog, pollen, and allergens from the inhaled airstream. However, these devices are less effective against the smaller particle sizes which characterize the Coronavirus and other strains of influenza (e.g., 0.1-0.3 microns).

For example, Albu U.S. Pat. No. 3,463,149 discloses a filter plug comprising a cotton body contained within a fabric covering. A medicament containing cylinder, having a stationary ported piston received therein, dispenses medicament into the body upon relative movement of the cylinder and piston.

Kronenberg U.S. Pat. No. 10,322,304 B2 discloses a two-stage filter system including a microfiber filter and a nanofiber filter used in series, with the nanofiber filter located downstream of the microfiber filter.

Dolezal U.S. Pat. No. 7,918,224 B2 discloses a pair of ellipsoidal filters exhibiting a corrugated structure to increase the surface area available for filtration.

Fiber-based filter materials are sometimes characterized by a "most penetrating particle size" (MPPS), which refers to that certain particle size (or range) against which the traditional mechanical filtering mechanisms (interception, impaction, and diffusion) are least effective. If the material exhibits high performance at a particular MPPS value, then particles both larger and smaller than this value will be collected with even higher performance. ("N95 Respirators and Surgical Masks", by Lisa Brosseau and Roland Berry Ann, Centers for Disease Control and Prevention (Oct. 14, 2009)).

The Albu, Kronenberg, Dolezal, Brosseau, and the other patent and non-patent references cited herein are hereby incorporated in their entirety.

Conventional facial masks which cover the mouth and nose typically employ relatively high impedance filter materials such as the materials used in N95-type respiratory masks. High impedance materials may be used in such masks without causing significant discomfort to the user because the large surface area of the mask material largely compensates for the high air flow impedance of the filter material. (See, Lee H P, Wang de Y "Objective assessment of increase in breathing resistance of N95 respirators on human subjects" Ann Occup Hyg. 2011; 55(8):917-921. doi:10.1093/annhyg/mero65; available at pubmed.ncbi.nlm.nih.gov/21893677/; Skaria, Shaji D, and Gerald C Smaldone. "Respiratory source control using surgical masks with nanofiber media." The Annals of occupational hygiene vol. 58,6 (2014): 771-81. doi:10.1093/annhyg/meuo23; available at ncbi.nlm.nih.gov/pmc/articles/PMC4090760/; Heow Pueh Lee, De Yun Wang, "Objective Assessment of Increase in Breathing Resistance of N95 Respirators on Human Subjects", The Annals of Occupational Hygiene, Volume 55, Issue 8, October 2011, Pages 917-921; available at doi.org/10.1093/annhyg/mero65; Tong, P.S.Y., Kale, A.S., Ng, K. et al. Respiratory consequences of N95-type Mask usage in pregnant healthcare workers—a controlled clinical study. Antimicrob Resist Infect Control 4, 48 (2015), available at doi.org/10.1186/s13756-015-0086-z and aricjournal-.biomed central.com/articles/10.1186/s13756-015-0086-z)

Presently known intra-nasal filters, on the other hand, typically employ low impedance filter materials due to the small cross-sectional area of the nasal pathway. However, low impedance materials often allow larger particle sizes to pass through, and also tend to have relatively higher MPP values. Longstanding and accepted design practices therefore recognize that the high impedance materials used in face masks are not well suited for intranasal use. That is, the 20-30 square inch surface area of a high impedance mask does not appreciably inhibit normal breathing. However, drawing the same volume of air through a conventional nasal filter having a surface area in the range of 0.25 in$^2$ would be uncomfortable if not physically impossible for most people. Presently known nasal filter designs therefor eschew high impedance filter materials in favor of lower impedance materials which exhibit correspondingly higher MPPS values. Consequently, very small particle sizes in the 0.1-0.3 micron range pass through such intra-nasal filters and enter the body, potentially causing infection.

Nasal filter devices and systems are thus needed which overcome these and other shortcomings of the prior art.

SUMMARY OF THE DISCLOSURE

Various embodiments of the present invention involve using a filter material having a relatively high intrinsic impedance to construct an intra-nasal filter stage, by configuring the filter material to present a large cross-sectional area and thereby reduce its effective impedance. In this way, relatively higher impedance materials may be employed without causing user discomfort or distress.

In this context, the term "impedance" refers to a material's resistance to airflow or pressure differential ($\Delta P$) across the filter, expressed in units of cmH$_2$O. For example, some surgical mask materials have impedance values in the range of 0.1865 and 0.1791 cmH$_2$O, whereas N95 masks have been found to exhibit impedance values in the range of 0.2664 cmH$_2$O. Airflow resistance (or impedance) across some nanofiber face masks range from 0.0504 to 0.0311 cmH$_2$O. $\Delta P$ across other facepiece materials range from 0.2426 to 0.2903 cmH$_2$O and others range from 0.249 to 0.3146 cmH$_2$O. Still other face piece materials range from 0.1762 to 0.1968 cmH$_2$O). Nanofiber materials have been found to exhibit impedance values ranging from 0.04449 to 0.05633 cmH$_2$O. (See, Skaria, Shaji D, and Gerald C Smaldone. "Respiratory source control using surgical masks with nanofiber media." The Annals of occupational hygiene vol. 58,6 (2014): 771-81. doi:10.1093/annhyg/meu023).

In some embodiments, a generally bullet shaped filter stage may exhibit complex geometries and surface topologies along its length to thereby distribute the high impedance material (e.g., in the range of 0.02 to 0.2 $cmH_2O$, and particularly about 0.05 to 0.1 $cmH_2O$) over a large effective cross sectional area, while still maintaining a form factor which fits comfortably within the nasal passage. This allows the filter to trap very small particle sizes (e.g., in the range of 0.1 micron) without encumbering the user's normal breathing amplitude or cadence.

One or more intra-nasal filter stages may exhibit geometric shapes resembling elongated cones with higher frequency topologies (e.g., fins, ribs, waves, pleats, bellows, zig-zags) on the cone surface. The topologies may be regular (resembling successively smaller stacked rings), or irregular much like branches extending from a Christmas tree. Alternatively, or in addition to such higher order shapes, the material may also be twisted about its longitudinal "axis" to superimpose a helical structure, further increasing the total surface area of the material. In addition, micro-structures may be formed on the branches, rings, tentacles, ribs, or the like, to even further maximize the aggregate surface area of the material.

Depending of the material's mechanical characteristics, it may be desirable to mechanically and/or thermally fatigue (e.g., heat) the material to increase its pliability to avoid breaches during filter formation.

Various production techniques may involve forming the shape of the filter while the filter material is being manufactured. For example, nano-fibers may be electrospun onto a mold which generally approximates the shape of the filter stage. Alternatively, or in addition, fibers may be vacuum formed (using either a wet slurry or dry fluff process) by drawing the fibers across a mesh form and thereafter heating and/or pressing the accumulated in a mold. Other techniques may involve "shrink wrapping" the material by applying the fibers to the surface of a mold or form which approximates the shape of the finished filter stage, and melting or chemically coalescing the fibbers into a continuous matrix in situ. The finished filter may then be removed or otherwise separated from the mold or tool. Alternatively, or in addition, the material may exhibit sufficient resiliency to allow it to be stretched as it is removed from the die, and return back to its nominal shape after removal.

Other techniques may involve using a mold material which is partially or wholly absorbed or otherwise integrated into the fibrous material during manufacture. For example, fibers may be applied to the concave or convex surface of a mold form, and heated and/or chemically catalyzed to form an integral structure which includes both the applied fibers and the underlying mold structure (generally analogous to mixing an epoxy resin with a hardener).

To avoid the "negative draft" problem in which the finished filter cannot be easily removed from the mold or die without breaking the die, a consumable die may be employed, for example using processes generally analogous to lost wax, three-dimensional (3D) printing, or other additive manufacturing techniques.

Other embodiments involve a single or multistage nasal filter device characterized by respective first and second most penetrating particle size values (MPPS1 and MPPS2) in a single layer or in two or more layers (or stages) of filter material. In this way, a "generic" device structure may be configured to support any number of different applications or use cases. That is, the same base nasal device may function as a template to support different combinations of stages, filter layers, and filter materials of different sizes, shapes, geometries, relative positions, and MPPS values. Moreover, various combinations and sub-combinations of the foregoing parameters may be optimized to tune the resulting device to one or more specific particle sizes (or ranges).

Various embodiments of the present invention involve a single or multistage nasal filter device characterized by respective first and second most penetrating particle size values (MPPS1 and MPPS2) in a single layer or in two or more layers (or stages) of filter material. In this way, a "generic" device structure may be configured to support any number of different applications or use cases. That is, the same base nasal device may function as a template to support different combinations of stages, filter layers, and filter materials of different sizes, shapes, geometries, relative positions, and MPPS values. Moreover, various combinations and sub-combinations of the foregoing parameters may be optimized to tune the resulting device to one or more specific particle sizes (or ranges).

Other embodiments involve materials, specifications, and manufacturing processes such as electrospinning with or without aerogel to generate micropores and macropores using silica nanospheres in a cage structure to create filter media which exhibits the desired MPPS value or values. These techniques and resulting materials can be used to either augment or replace the use of woven fabric to yield the sieve type pore structures used today. Other embodiments involve design metrics and assembly techniques for configuring these filter materials such that the overall device has a sufficiently low aggregate impedance to avoid discomfort, notwithstanding the high intrinsic impedance of some of the material components.

Other embodiments involve arranging the high impedance material layers such that they exhibit an effective surface area far greater than the cross-sectional area of a typical nasal passage. For example, by folding or otherwise imparting pleats, undulations, bellows, or other regular or irregular geometric features or patterns into the material, the effective impedance may be substantially reduced (relative to a planar sheet positioned orthogonal to the direction of airflow), while still maintaining the benefits of low MPPS values. That is, rather than employing a two dimensional planar filter layer, the present inventions proposed to expand the layer into three spatial dimensions to thereby increase the effective surface area and reduce the effective impedance of the layer.

Other advantages of the invention surround exploiting various synergies resulting from: i) selectively configuring MPPS values for one or more filter layers; ii) using electrospinning or other material fabrication techniques to produce the filter materials with the desired mechanical (MPPS) and chemical characteristics, either in addition to or in lieu of conventional woven fabric filter materials and the conventional manufacturing techniques used to produce them; iii) superimposing geometric convolution onto the filter layer(s) to mitigate the impedance issues presented by the low particle size MPPS values; and iv) optimizing the foregoing in a single stage or multiple stages to thereby tune the device a particular particle size or sizes; v) embedding into or coating the surfaces of some of the foregoing components with an antiseptic which causes the user to swab the distal region of the nasal mucosa while inserting the device into the nose; and vi) designing a structural nasal filter template or frame which fits securely and comfortably inside the nose, but which can be adapted to—or tuned to— different particle sizes or "set points" by using different combinations of filter materials.

Various embodiments of the present disclosure relate to single stage nasal filters and other embodiments relate to multi-stage nasal filters. Various embodiments a first stage filter material exhibiting a first MPPS value and a second stage filter material exhibiting a second MPPS value, wherein at least one of the materials is convoluted or otherwise configured in three spatial dimensions to reduce the effective impedance of the filter stage. Other embodiments employ electrospun materials to facilitate tuning one or more MPPS values associated with one or more filter stages, respectively, to a desired particle size or sizes. Other embodiments include a pair of single or multi-stage filters connected by a band (e.g., 0.25-1 mm cross-section) to facilitate manual removal, where the initial (first) stage has a smaller pore size (or MPPS value) than the intermediate (second) stage, and the final (third) stage has a smaller pore size (or MPPS value) than the first and second stages. One or more stages may exhibit electrostatic properties and/or be coated (or saturated) with an antiseptic or disinfectant such as povidone iodine or iodoprovidone, commonly marketed under the brand name Betadine™ or silver.

The shape and size of adjacent stages (e.g., the second and third stages) may be configured to induce venturi-type turbulence proximate the stage 2/stage 3 interface, causing increased contact between particulates and the antiseptic borne by the filter fibers. For example, eddy currents resulting from turbulent air flow may cause pathogens to contact (and thus be killed by) antiseptic borne by one or more of:
  i) the distal surface of the second stage filter;
  ii) the proximal surface of the second stage filter;
  iii) internal passages within the second stage filter;
  iv) the distal surface of the third stage filter;
  v) the proximal surface of the third stage filter;
  vi) internal passages within the third stage filter;
  vii) aerosolized antiseptic proximate the distal surface of the second stage filter;
  viii) aerosolized antiseptic proximate the proximal surface of the second stage filter;
  ix) aerosolized antiseptic proximate the distal surface of the third stage filter;
  x) aerosolized antiseptic proximate the proximal surface of the third stage filter; and/or
  xi) aerosolized antiseptic within the space between the second and third stage filters.

In an embodiment, the second stage comprises a resiliently deformable foam-type material having slightly larger cross-section than the nasal passage within which it is disposed. The third stage comprises a sheet or blanket of fabric loosely enveloping the second stage and forming an air gap therebetween. Once the assembly is inserted into the nostril, the second stage resiliently expands to synchronously urge both the second and third stages against the internal surfaces of the septum and nares, forming a perimeter seal. In this way, as the "oversized" assembly is inserted into the distal portion of the nasal passage, the exposed mucosa is swabbed with antiseptic. This swabbing effectively kills any pathogenic particulates which might otherwise enter the body through the distal mucosa located "upstream" of the inserted filter assembly.

A further embodiment contemplates a sealed package (e.g., plastic, foil) which contains a single or multi-stage nasal filter immersed in an aqueous antiseptic environment. The sealed package maintains sterility of the device prior to insertion, and also ensures that the filter materials (e.g., cotton, foam, fabric) remain saturated with antiseptic solution until used. This also ensures that the distal mucosa will be liberally swabbed during insertion, without the need for supplemental swabbing.

BRIEF DESCRIPTION OF THE DRAWING FIGURES

A more complete understanding of the embodiments of the present disclosure may be derived by referring to the detailed description and claims when considered in connection with the following illustrative figures, and:

FIG. 1 is a schematic cross-section view of a multi-stage filter prior to nasal insertion in accordance with various embodiments;

FIG. 2 is a schematic cross-section view of the multi-stage filter subsequent to nasal insertion in accordance with various embodiments;

FIG. 3 is a detail schematic cross-section view of venturi-type turbulence proximate stages 2 and 3 in accordance various embodiments;

FIG. 8 is a schematic cross-section view of an alternate embodiment of a multi-stage filter wherein the second stage comprises a hollow interior defining a plurality of concave finger-like geometric convolutions in accordance with various embodiments;

FIG. 9 is a schematic cross-section view of a further embodiment of a filter of FIG. 8, wherein the second stage comprises a "solid" interior terminating in a plurality of convex convolutions in accordance with various embodiments;

FIG. 10A is a schematic cross-section view of an alternate embodiment of a multi-stage filter similar to FIG. 8 or 9, including a resiliently expandable claw disposed with its convex region extending in the distal direction of the nasal passage in accordance with various embodiments;

FIG. 10B is a schematic cross-section view of an alternate embodiment of a multi-stage filter similar to FIG. 10, with the resiliently expandable claw disposed with its concave region extending in the distal direction of the nasal passage in accordance with various embodiments;

FIG. 11 is perspective view of the claw shown in FIG. 10; and

Figure 12A:
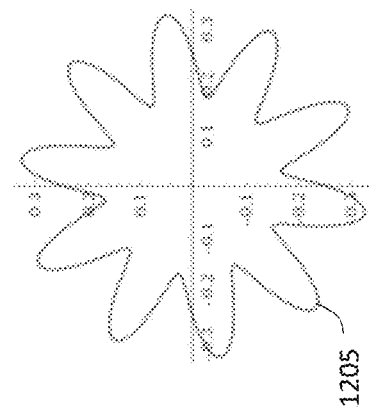
Figure 12B:
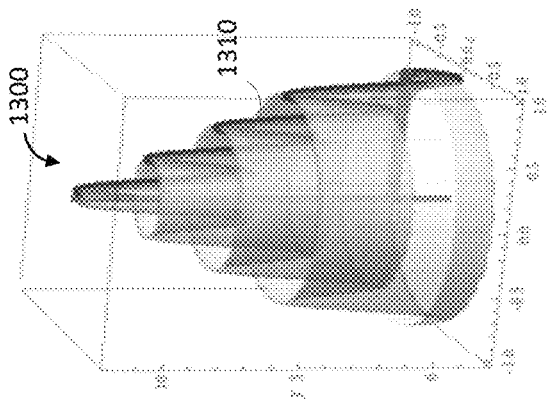
Figure 12C:
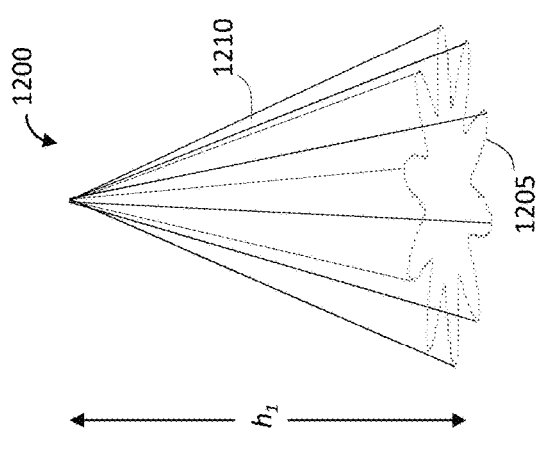
Figure 12D:
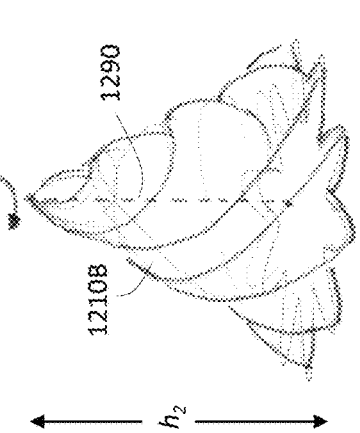

FIGS. 12A-12C depict cross-section views of exemplary filter material configurations designed to maximize the material surface area within the envelope between the distal (proximate the septum) and proximal (approaching the sinus) regions of the nasal pathway in accordance with various embodiments, and FIG. 12D illustrates an alternate embodiment in which the material is configured as a surface-of-revolution of sinusoidal curve around the longitudinal axis.

It will be appreciated that elements in the figures are illustrated for simplicity and clarity and have not necessarily been drawn to scale. For example, the dimensions of some of the elements in the figures may be exaggerated relative to other elements to enhance clarity of the accompanying descriptions of various illustrated embodiments. Moreover, although various embodiments are illustrated in the context of a single device to be inserted into a single nostril, those skilled in the art will appreciate that each single filter assembly comprises one of a pair of identical or mirror image filters configured to be inserted into both nostrils.

DETAILED DESCRIPTION OF EXEMPLARY EMBODIMENTS

Various embodiments of the disclosure involve filter materials which may be characterized by either a pore size which generally corresponding to the smallest particle captured by the material, or a "most penetrating particle size" (MPPS) value which refers to a particle size at which the material is least efficient. That is, if a material demonstrates high performance (i.e., high filtering efficiency) at a particular MPPS value, then the material will collect particles both larger and smaller than the MPPS value at even higher performance. The present inventor has determined that both woven and non-woven material filter materials may be effectively "tuned" to one or more MPPS values by using small diameter fibers (e.g., submicron and nano-fibers) manufactured using techniques such as electrospinning, force spinning, and fiber splitting. (See, "Synthesis and Applications of Electrospun Nanofibers" by Ramazan Azmatula and Waseem Khan (ScienceDirect 2019); and "Filter Media" by Trevor Sparks and George Chase, Filters and Filtration Handbook (Sixth Edition) (2016).)

Sub-micron and nano-fibers may be used in the context of various embodiments to "tune" filter materials to one or more particular MPPS values, for example in the range of 0.001-100 microns, and alternatively in the range of 0.05-20 microns, such as 0.1-0.3 microns for typical influenza virus particle (including 0.125 microns for the Coronavirus). The MPPS values may also correspond to one or more specific particle sizes (=/−0.1 to 10% of the nominal value) such as 0.1 micron, 0.15 microns, 0.2 microns, 0.25 microns, 0.3 microns, 0.35 microns, 0.4 microns, 0.5 microns, 1 micron, and fractional and/or integer multiples thereof.

In accordance with a further aspect of the invention, a particular filter layer may substantially or essentially comprise a single material or a plurality of materials. A particular filter layer may be manufactured or assembled using one or more processes including electrospinning, force spinning, and fiber splitting, in addition to or in lieu of woven and non-woven assembly techniques. A particular filter layer may comprise a substantially homogeneous distribution of fiber sizes of substantially the same length L and diameter D (where D may be on the order of 1 micron or greater, sub-micron, or in the range of nano-fibers).

In other embodiments, the layer may comprise a heterogeneous distribution of fiber materials and/or sizes expressed as, for example, "the composition X %+Y % . . . +Z %;" where X+Y . . . +Z=100, and X, Y, . . . and Z represent the relative amounts of the constituent components of the finished filter layer. For example, a layer may comprise 60% fibers of attribute X, 30% fibers of attribute Y, and 10% fibers of attribute Z; where X corresponds to a fiber diameter in the range 1 nanometer, Y corresponds to a fiber diameter in the range of 1 micrometer, and Z corresponds to a fiber diameter in the range of 1 micron. Alternatively, X, Y, and Z may represent a class or type of material such as a natural (e.g., cotton) or synthetic (e.g., a hydrocarbon chain) fiber.

As a further alternative, X, Y, . . . and Z may represent, in addition to or in lieu of the foregoing attributes, one or more material properties of a constituent component of the layer, including physical (e.g., tensile strength, shear strength), chemical (crosslinking or hydrogen bonding sites), and/or electromagnetic properties. In this regard, the present invention further contemplates that a particular filter layer may be cut from a larger sheet of material which itself comprises a single layer. Alternatively, the filter material may comprise one or more layers which may be adjacent and substantially parallel when in a planar orientation, or they may be interwoven, stitched, spot welded, thermally, chemically, and/or mechanically bonded, or otherwise interwoven to form an ordered or unordered matrix.

The various sublayers or subcomponents comprising the resulting filter material may be made from the same or different materials, made from the same or different manufacturing processes, and may comprises different thicknesses and other mechanical properties and may be loosely bound (or not bound at all) to all or a portion of one or more adjacent sublayers. In addition, each layer may be exhibit various degrees and/or combinations of surface features, nano and/or micro-geometric structures, electrostatic properties, surface finishes, surface properties such as tackiness and lubricity, and chemical and/or mechanical affinities to facilitate inter and intra layer bonding or adhesion.

In accordance with a further aspect of the invention, various combinations of the foregoing variables may be employed in an effort to best advance the foregoing design objectives. After measuring and recording the true MPPS values and other reliability and performance metrics, various input and control parameters may be iteratively adjusted in subsequent trials, for example employing machine learning techniques and related models to ultimately yield stable and cost effective protocols (or "recipes") for producing filter materials which reliably and repeatedly exhibit the desired properties, including MPPS values.

Referring now to FIG. 1, a first embodiment of a multi-stage nasal filter assembly 100 comprises all or a subset of a first stage filter 110, a second stage filter 120, and a third stage filter 130. The first stage filter no may comprise a disc shaped structure supporting a first filter layer characterized by one or more MPPS values. The second stage filter 120 may partially or wholly comprise a semi rigid or resiliently deformable material such as plastic or nylon.

The second stage filter may also include one or more sub-layers embedded into, circumscribing, or otherwise adjacent to the internal and/or external boundary surfaces of element 120. In addition, one or more of the filter layers may be convoluted; that is, the material may be folded, pleated, or otherwise configured to expand the effective surface area of the material in three dimensions as described in greater detail below in conjunction with FIG. 8.

In this way the second stage may expand when inserted to form a gentle seal along a portion of its exterior perimeter with a corresponding region of the interior nasal walls. At the same time, the second stage filter material (and the other stages as well) may embody the desired MPPS value(s), without the high impedance associated with conventional planar filter layers typically implemented in two-dimensions.

With continued reference to FIG. 1, the interface 115 between the first and second stages may comprise a bearing surface, contactless (a gap), or partial contact between the first and second stages. An air gap 127 between the second and third stages provides a region in which antiseptic liberated from one or more filter layers may be aerosolized due to turbulent air flow, as described in greater detail below in conjunction with FIG. 3. One or more of the filter layers may include N95, N99, N100, or analogous materials of the type used in presently known respirator-type facial masks made by the 3M Company of Saint Paul, Minn.

With continued reference to FIG. 1, second stage filter 120 may be generally cone shaped with a domed terminus, while also exhibiting a generally elliptical cross section to closely mate with the internal nasal cavity upon insertion therein. Prior to insertion, the foam or other resiliently deformable material comprising the second stage filter exhibits a cross-section dimension $d_1$. As described below in connection with FIG. 2, as the device is inserted into and manually guided upwardly into the nostril 200, the second stage filter material compress slightly, and thereafter expands in situ to urge the second and third stage filter radially outwardly against the internal nasal cavity, forming a perimeter seal. (See the interface 125 between the second and third stage filters shown in FIG. 2.) In an alternate embodiment, the distal region of the second stage filter structure may be flared outwardly to provide additional spring force proximate the perimeter seal.

FIG. 2 shows the filter assembly inserted into the nostril between the septum 202 and the nares 204, with the direction of inhaled air flow being indicated by arrows 261 (pre-filter) and 262 (post filter). As shown, the compressed cross-section dimension $d_2$ is slightly less than the uncompressed dimension $d_1$ of FIG. 1. As the antiseptic saturated filter material is inserted, the exposed distal mucosa 252 and 254 are swabbed, providing an antiseptic coating which eliminates (or at least mitigates) the entry vector for pathogens associated with prior art devices. An air gap 290 between the second and third stages is discussed below in connection with FIG. 3.

FIG. 3 schematically illustrates turbulent air flow resulting from venturi-type effects of air flowing through a restricted zone (e.g., the second and/or third stage filters). As shown, an air gap 227 may be formed between surface 331 of the second stage filter 120 and surface 332 of the third stage filter 130. In particular, pathogens 301 intermingle with aerosolized droplets 305 in the air gap 227 between the second and third stages, as well as in the region of second stage 120 adjacent to and upstream of surface 331, the regions within third stage filter 130 and downstream of the second filter stage 120, and/or near surface 333 of the third stage filter 130.

In an alternate embodiment, a fourth filter stage filter generally similar in size, shape, structure, and function to the third filter stage, may be disposed downstream (during inhalation) of the third stage filter and loosely encapsulating or circumscribing a portion of the third stage (to the right of element 333 in FIG. 3). The fourth stage should be configured to form a substantial gap between the third and fourth stages, and provide a supplemental reservoir of antiseptic to be aerosolized as the airstream leaves the device. The role the fourth stage plays in eliminating harmful particles relies as much or more on chemical mechanisms than mechanical ones. As such, the fourth stage material may suitable exhibit a relatively high MPPS value and correspondingly low impedance.

Figure 4:
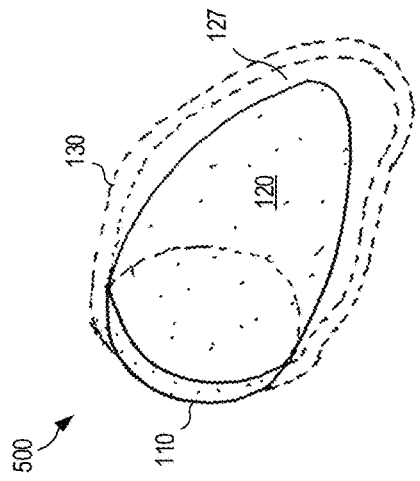
FIG. 4 is a schematic cross-section view of an alternate embodiment of a multi-stage filter in accordance with various embodiments.

FIG. 4 is a schematic cross-section view of an alternate embodiment of a multi-stage filter 400 wherein the outer perimeters of the first stage 110 and the third stage 130 are substantially coextensive proximate their junction.

Figure 5:
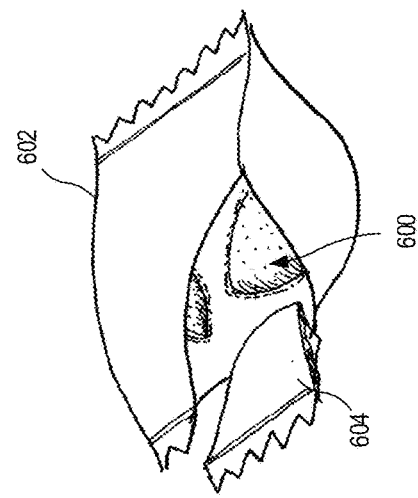
FIG. 5 is a schematic perspective view of a one side of a dual multi-stage nasal filter in accordance with various embodiments.

FIG. 5 is a schematic perspective view of one side 500 of a dual multi-stage nasal filter showing the air gap 127 in three dimensions. In this regard, note that one or more air gaps for facilitating eddy currents and turbulence may be configured to exhibit any desired size or volume.

Figure 6A:
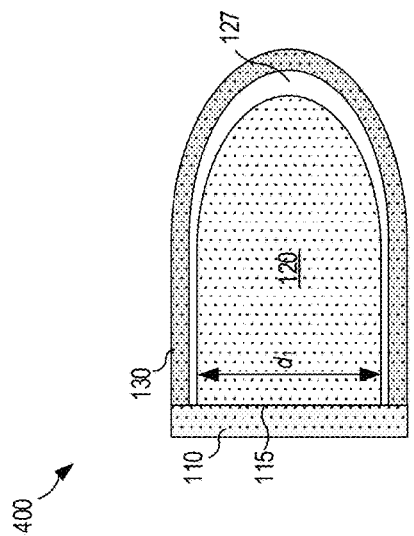
FIG. 6A is a perspective view of a sealed package containing a nasal filter saturated in an aqueous antiseptic solution in accordance with various embodiments.

FIG. 6A is a perspective view of a sealed package 602 containing a pair 600 of nasal filters saturated in an aqueous antiseptic solution in accordance with various embodiments.

Figure 6B:
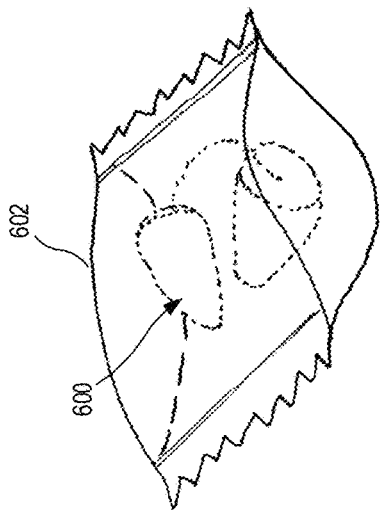
FIG. 6B is a perspective view of the package of FIG. 6A torn open to reveal the saturated nasal filter in accordance with various embodiments.

FIG. 6B is a perspective view of the package of FIG. 6A shown torn open by removing segment 604 to reveal the saturated nasal filters.

Figure 7:
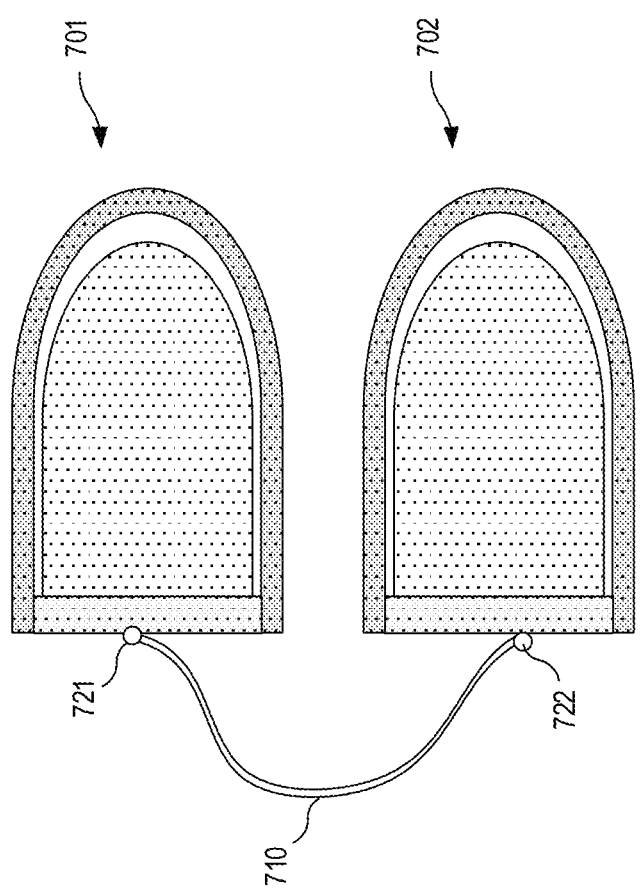
FIG. 7 is a cross section view of a pair of filters interconnected by a band.

FIG. 7 illustrates a pair of nasal filters 701, 702 and a band 710 interconnecting the two filters together. In the illustrated embodiment the band 701 is connected to filter 701 at a connection point 721, and the band 701 is connected to filter 702 at a connection point 722. Those skilled in the art will appreciate that the bad may connect to each filter at any convenient point on any desired filter stage.

FIG. 8 depicts a multistage filter device Boo including a first filter stage 810, a second filter stage 822, and a third stage 830. A space 827 may separate the second stage 822 from the third stage 830. A portion of the second stage 822 may abut a portion of the first stage 810 along an interface 815. As shown, the second stage 822 may comprise regular or irregular convolutions 823 (which may optionally yield a hollow portion or internal volume 821). As illustrated, the second stage 822 comprises a hollow interior defining a plurality of concave finger-like convolutions 823, increasing the effective surface area of the filter layer and reducing its impedance.

As shown in FIG. 8, convoluting one or more of the filter stages (or their sub-components) increases the surface area through which ambient air is drawn and expelled, thereby reducing the impedance associated with a non-convoluted version of the same material.

FIG. 9 illustrates an alternate embodiment 900 of the multi-stage filter of FIG. 8, wherein the second stage 920 comprises a "solid" interior terminating in a plurality of convex convolutions 925, resulting in a substantial gap 927 between the ends of the convolutions and the inside surface of the third stage filter layer 930. A resiliently expandable ring 910 may be used to help urge the second (and possibly the first) stage material outwardly against the adjacent nasal wall to form a perimeter seal. The optional ring 910 may be integral to the first stage filter structure, circumscribe the first stage structure, or partially or entirely replace the first stage.

FIG. 10A is a schematic cross-section view of an alternate embodiment 901 of a multi-stage filter similar to FIG. 8 or 9, including an optional, resiliently expandable claw 911 disposed with its convex region extending in the distal direction of the nasal passage. The claw performs a function similar to that performed by ring 910, and may thus be used in addition to or in lieu of the ring. Additionally, as seen in FIG. 11, the claw 911 is non-planar, providing a three-dimensional platform to support a cup-shaped first stage filter layer, if desired. In particular, the hub 912 of the claw provides low impedance support for a center portion of a cup—shaped filter layer, and the spoked extensions 914 provide low impedance structural support for radial portion of the filter layer.

FIG. 10B is a schematic cross-section view of an alternate embodiment 902 of a multi-stage filter similar to FIG. 10A, with the resiliently expandable claw 911 disposed with its concave region extending in the distal direction of the nasal passage in accordance with various embodiments; and FIG. 11 is perspective view of the claw 911 shown in FIGS. 10A and 10B.

In various embodiments, pore sizes for the materials comprising the filter stages range from 0.001 microns to 1000 microns. Moreover, a particular filter stage may include multiple pore sizes (which may increase turbulence).

As mentioned above, a filter stage may incorporate a sheet of material formed in such a way that it includes geometrical features and structural attributes configured to maximize its effective surface area when deployed within a given volume—e.g., the volume defined by the distal and proximal regions of the nasal pathway.

For example, and referring now to the exemplary embodiments shown in FIGS. 12A-12C, a filter stage may have a structure comparable to that produced by (1) forming a generally conical structure 1200 having longitudinally ribbed conical surface 1210 extending from a sinusoidal or otherwise "lobed" perimeter 1205 (as depicted in FIG. 12B), and then twisting the material 1210 (FIG. 12C) around its longitudinal axis 1290 such that material 1210B ultimately forms a tapered helical structure 1200B. In an embodiment, the height $h_2$ of structure 1200B may be less than the height $h_1$ of structure 1200 by an amount that is roughly proportional to the rotation angle associated with the tapered helical structure 1200B. This ratio ($h_2/h_1$) is referred to as the axial compaction ratio, and can be selected in such a way that structure 1200B fits within the axial dimensions of a particular volume (e.g., the nasal cavity) while still providing the effective surface area of taller structure 1200.

With respect to the resulting effective surface area, the structure 1200 illustrated in FIG. 12A has a significantly higher surface area than a conventional cone having the same height ($h_1$) and a circular base that would entirely encompass sinusoidal base 1205—i.e., a circle having a radius equal to the radial extrema of base 1205 in FIG. 12B.

In the illustrated embodiment, for example, base 1205 can be described by the polar equation:

$$r=c+m\sin(z\theta), \quad (1)$$

where r is the radius at angle θ, c is a radial offset value, m is an amplitude parameter, and z is a frequency parameter. More intuitively: as the parameter z increases, the number of lobes increases; as the parameter c decreases, the inner diameter of the base (the radial minima) decreases; and as m decreases, the amplitude and consequently outer diameter of the sinusoidal curve itself decreases. Thus, through careful choice of c, m, and z, a wide variety of base geometries may be formed.

In general, the overall arc length s of base 1205 within the plane is given by:

$$s = \int_0^{2\pi} \sqrt{r^2 + \left(\frac{dr}{d\theta}\right)^2}\, d\theta, \quad (2)$$

Where r(θ) corresponds to equation (1). In addition, it can be shown that the surface area A of the structure (excluding the area of the base) is given by:

$$A = \frac{s\sqrt{h^2+c^2}}{2}. \quad (3)$$

By way of example, the particular base curve illustrated in FIG. 12B is given by:

$$r=0.25+0.08\sin(10\cdot\theta), \quad (4)$$

where the parameters, and r, have the units of inches. That is, the base has an average radius of about a quarter-inch. When substituted into equation (2) and numerically integrated, this gives the arc length:

$$s=\int_0^{2\pi}\sqrt{0.64\cos^2(10\theta)+(0.25+0.08\sin(10\theta))^2}\,d\theta \quad (5)$$

$s=3.68$ in

Assuming a height $h=1.0$, the surface area can be computed as:

$$A = \frac{3.68\sqrt{1.0+0.25^2}}{2} = 1.90\text{ in}^2.$$

In comparison, a simple cone with a radius r, and height h, has a surface area of:

$$A=\pi r\sqrt{h^2+r^2}=0.809\text{ in}^2.$$

Thus, it can be seen that, by forming the filter stage such that it has a sinusoidal base (or similar lobed structure), the surface area is increased such that it is approximately 2.35× the surface area of a comparable cone (i.e., more than doubled).

When combined with the compaction ratio defined above, it can be seen that the benefits of forming the helical structure allow even greater benefits, as a higher value of h can be selected while still remaining with the predefined volume. By selecting the number of helical turns as well as the parameters c, m, and z, the effective area can be increased even further, to more than 10 times the expected surface area.

FIG. 12D illustrates an alternate embodiment 1300 in which the material 1310 is configured as a surface-of-revolution of sinusoidal curve around the longitudinal axis. That is, the illustrated curve has the form:

$$\text{surface of revolution: } y=-kx+d+l\sin(nx),$$

where k, d, and l are constants. It has been found that structures with this form also provide some of the benefits of the above embodiment—i.e., material with a relatively large surface area can be enclosed within a relatively small nasal cavity volume.

Those skilled in the art will appreciate that the foregoing geometric configurations are merely exemplary, and that the present invention contemplates virtually any geometric, topological, and/or other spatial manipulation of the filter material which increases the surface area and thereby reduces the impedance of the filter material.

Additional embodiments may contemplate a filter wherein a particular stage itself comprises two "stages," wherein the airflow is forced sideways along the inspiration path causing increased interaction with filter walls.

A further embodiment involves a single stage device for allergens, wherein the single stage comprises a compressible foam or other resiliently deformable material with entrained antiseptic.

A method is thus provided for installing a nasal filter device into a nostril, where the device includes a resiliently deformable component and first filter stage having a first filter layer. The method includes: manually opening a sealed envelope containing the device in a liquid antiseptic medium; removing the device from the package; inserting the device into a distal region of the nostril; and urging the device from the distal region upwardly into the nostril while simultaneously swabbing the distal region with liquid antiseptic medium present on the perimeter of the deformable component.

In an embodiment, the first filter layer is characterized by a most penetrating particle size (MPPS1) value in the range of 0.1 to 0.3 micrometers (um).

In an embodiment, the first filter layer is characterized by a most penetrating particle size (MPPS1) value of about 0.125 micrometers (um).

In an embodiment, the liquid medium comprises at least one of an antiseptic and a disinfectant, and wherein swabbing comprises rotating the deformable component against the distal region of the nostril while urging the device upwardly.

In an embodiment, the first filter layer comprises electrostatic material.

In an embodiment, the first filter layer comprises an electrospun material.

In an embodiment, the first filter layer comprises three dimensional convolutions.

In an embodiment, the nostril is characterized by a cross-sectional area of about K (inches)2; and the convolutions are configured to impart an effective cross-sectional surface area to the first filter layer of at least 2k, and in some cases wk.

In an embodiment, the method further includes: leaving the device within the nostril for a period of time in the range of one to six hours; and thereafter removing the device from the nostril.

In an embodiment, the first filter layer is further characterized by two different values MPPS1 and MPPS1.2.

In an embodiment, the device further comprises a second filter stage having a second filter layer is characterized by a second MPPS2 value.

In an embodiment, the second filter layer comprises electrospun fibers having diameters in the submicron range.

A nasal filter device is also provided for insertion into a nostril having an internal nostril circumference. The device includes: a first stage having a first filter layer; and a second stage having a second filter layer characterized by an MPPS2 value.

In an embodiment, the second filter layer comprises an electrospun material.

In an embodiment, the nostril is characterized by a cross-sectional area of about K (inches)2; and the second filter layer comprises convolutions configured to impart an effective cross-sectional surface area to the second filter layer of at least 2k, potentially wk.

In an embodiment, the second stage comprises a resiliently deformable component configured to swab the distal region of the nostril interior with a disinfectant during device installation.

In an embodiment, the device further includes a third stage having a third filter layer characterized by an MPPS3 value.

In an embodiment, the third filter layer comprises an electrospun material, and wherein MPPS3 value is different from the MPPS2 value.

In an embodiment, the third filter layer comprises a flexible sheet loosely enveloping at least a portion of the second stage and forming an air gap therebetween; and the device includes a spring element configured to urge the distal portion of the second stage outwardly to form a perimeter seal with the inside of the nostril.

A nasal filter device is also provided, comprising: a resiliently deformable element configured to form a perimeter seal with the inner nostril wall and to swab the distal portion of the internal nostril region with a disinfectant during device installation; a first filter stage having a first filter layer characterized by first geometric convolutions and a first MPPS1 value; and a second filter stage having a second filter layer characterized by second geometric convolutions and a second MPPS2 value A method is also provided for impeding the inhalation of particulates using a resiliently deformable filter packaged in a sealed envelope containing a liquid medium. The method includes: opening the sealed package to thereby expose the filter to ambient air; removing the filter from the package; inserting the filter into a distal region of a nostril; and urging the filter from the distal region to a proximal region of the nostril while simultaneously swabbing the distal region with liquid medium present on the perimeter of the filter.

In an embodiment, the filter is characterized by a mean pore size in the range of 0.1 to 100 micrometers (um), and preferably 0.5 to 50 um, and most preferably 0.1 to 10 um.

In an embodiment, the particulates comprise allergens, and further wherein the filter is characterized by a mean pore size in the range of 3 to 7 um.

In an embodiment, the liquid medium comprises an antiseptic.

In an embodiment, the liquid medium comprises a disinfectant.

In an embodiment, the particulates comprise microorganisms.

In an embodiment, the particulates comprise allergens.

In an embodiment, the filter comprises electrostatic material.

In an embodiment, the liquid medium comprises povidone iodine.

In an embodiment, swabbing comprises rotating the filter within the distal region of the nostril.

In an embodiment, swabbing comprises simultaneously rotating and urging the filter upwardly within the nostril.

In an embodiment, the method further includes: leaving the filter within the proximal region for a period of time in the range of five minutes to eighteen hours; and thereafter removing the filter from the nostril.

In an embodiment, the method further includes: leaving the filter within the proximal region for a period of time in the range of one to six hours; and thereafter removing the filter from the nostril.

In an embodiment, the filter further comprises a pair of filters connected by a band.

In an embodiment, the method further includes removing the pair of filters from respective nostrils by manually pulling on the band.

In an embodiment, the filter further includes: an initial stage characterized by a first pore size; an intermediate stage characterized by a second pore size; and a final stage characterized by a third pore size; wherein the third pore size is a smaller than the first and second pore sizes.

A nasal filter is provided for insertion into a nostril having an internal nostril circumference. The filter includes: an initial stage characterized by a first pore size; an intermediate stage characterized by a second pore size; and a final stage characterized by a third pore size; wherein the third pore size is a smaller than the first and second pore sizes.

In an embodiment, the initial stage comprises a perimeter ring supporting a substantially planar filter material; the intermediate stage comprises a resiliently deformable filter material having a substantially flat distal end adjacent the initial stage and a dome shaped proximal end; and the final stage comprises a sheet of fabric loosely enveloping the intermediate stage and forming an air gap therebetween.

In an embodiment, at least one of the initial, intermediate, and final stages comprise an antiseptic coating.

In an embodiment, the resiliently deformable filter material is configured to urge the sheet of fabric against internal nostril circumference.

The description of exemplary embodiments of various filter stages and their materials and functions is merely exemplary and is intended for purposes of illustration only; the following description is not intended to limit the scope of the disclosure or the claims. Moreover, recitation of multiple embodiments having stated features, compositions, or properties is not intended to exclude other embodiments having additional features, compositions, or properties, or other embodiments incorporating different combinations of the stated features, compositions, or properties, unless otherwise noted herein.

Although exemplary embodiments of the present disclosure are set forth herein, it should be appreciated that the disclosure is not so limited. For example, although materials, media, apparatus, systems, and methods are described in connection with multi-stage filters, the invention may also be used in the context of single stage filters. Various modifications, variations, and enhancements of the materials, methods, and media set forth herein may be made without departing from the spirit and scope of this disclosure.

The invention claimed is:

1. An intra-nasal filter device for use in a nasal cavity having an internal circumference extending from a proximal region proximate the sinus to a distal region proximate the septum, the device comprising:
   a first filter stage to be positioned proximate the septum; and
   a second stage comprising a filter material extending proximally from the first filter stage;
   wherein the filter material as incorporated into the second stage exhibits an impedance in the range of 0.02 to 0.2 cmH$_2$O, and aggregate surface area in the range of 0.5 to 2 square inches; and
   wherein the second filter stage comprises longitudinal ribs twisted to form a closed tapered helical structure.

2. The device of claim 1, wherein the second filter stage further comprises micro-features.

3. The device of claim 2, wherein the micro-features comprise a regular repeating pattern of undulations.

4. The device of claim 1, wherein the filter material comprises nanofibers.

5. The device of claim 1 wherein the filter material comprises an electrospun material.

6. The device of claim 1, wherein the filter material as incorporated into the second stage exhibits impedance in the range of 0.05 to 0.1 cmH$_2$O, and the aggregate surface area is in the range of 0.5 to 1 square inches.

7. The device of claim 1, further comprising a resiliently deformable outer component configured to swab the distal region of the nostril interior with a disinfectant during device installation.

8. The device of claim 1 further comprising a spring element configured to urge the distal portion of the second stage outwardly to form a perimeter seal with the inside of the nostril.

9. The device of claim 1 further comprising a third filter stage comprising a flexible sheet loosely enveloping at least a portion of the second stage and forming an air gap therebetween.

10. The device of claim 1 wherein the filter material exhibits electrostatic properties.

11. The device of claim 1 wherein:
    the first stage is characterized by a first MPPS1 value; and
    the second stage is characterized by a second MPPS2 value.

12. The device of claim 1 wherein the material is characterized by two different values MPPS1 and MPPS1.2.

13. The device of claim 1 wherein the material is characterized by a most penetrating particle size (MPPS1) value of about 0.125 micrometers (urn).

14. An intra-nasal filter device comprising:
    a first stage filter proximate the septum; and
    a second stage filter comprising a flexible material extending upwardly from the first filter stage filter;
    wherein the second stage filter comprises longitudinal ribs twisted to form a closed tapered helical structure and has:
    an impedance value, as incorporated into the second stage filter, in the range of 0.02 to 0.2 cmH$_2$O;
    an aggregate surface area in the range of 0.5 to 2 square inches.

15. The device of claim 14, wherein the flexible material comprises electrospun nanofibers exhibiting electrostatic and disinfectant properties.

* * * * *